(No Model.)
E. M. BENTLEY
ELECTRIC RAILWAY.
No. 305,729. Patented Sept. 23, 1884.
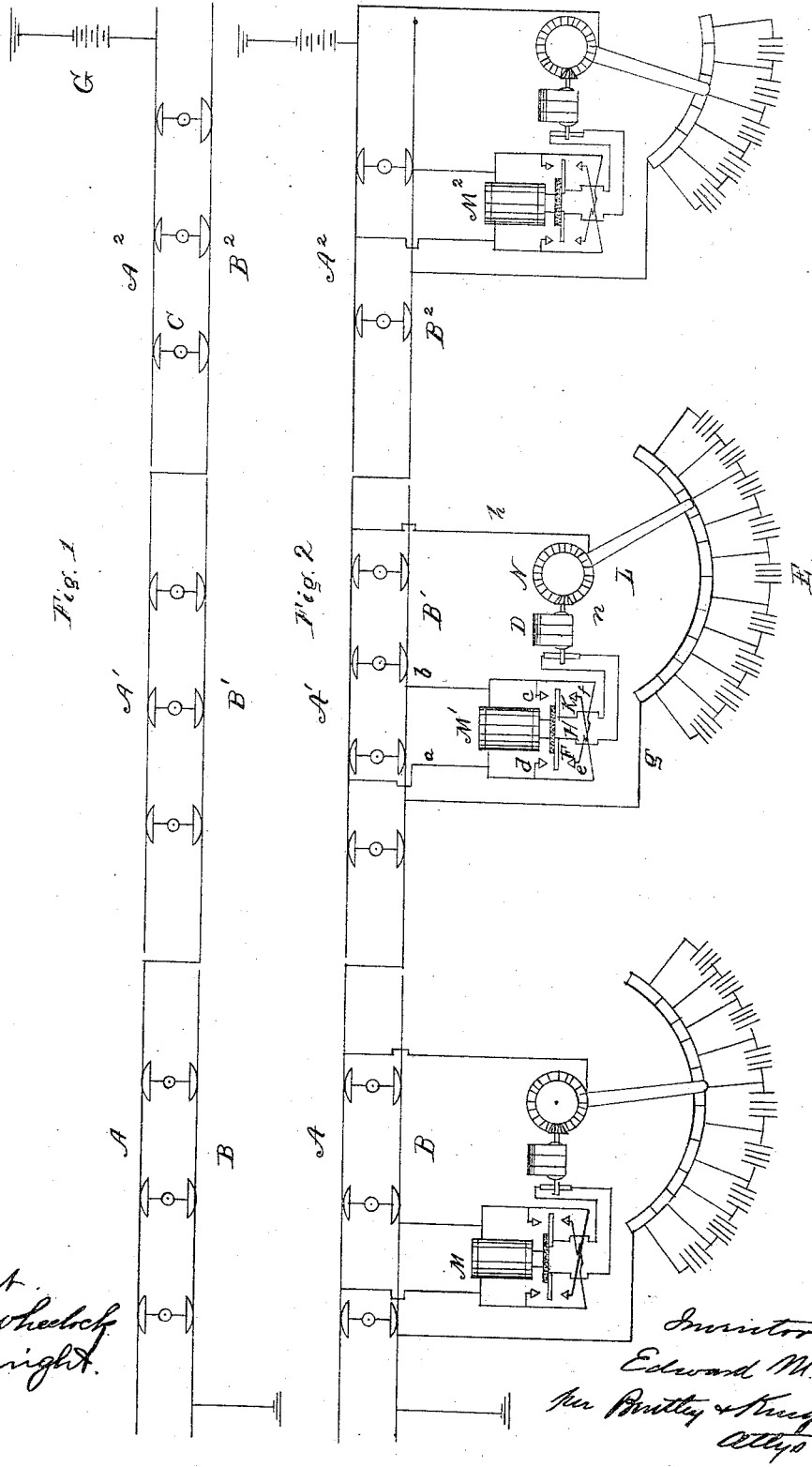

UNITED STATES PATENT OFFICE.

EDWARD M. BENTLEY, OF BROOKLYN, NEW YORK.

ELECTRIC RAILWAY.

SPECIFICATION forming part of Letters Patent No. 305,729, dated September 23, 1884.

Application filed July 23, 1884. (No model.)

*To all whom it may concern:*

Be it known that I, EDWARD M. BENTLEY, a citizen of the United States, residing at Brooklyn, New York, have invented certain new and useful Improvements in Electric Railways, of which the following is a specification.

My invention consists in devices for permitting electric locomotives to be run in multiple series.

In the accompanying drawings, Figure 1 is a general diagram of my multiple-series arrangement, and Fig. 2 is the same with the addition of the compensating devices.

Along the line of an electric railway I extend two sectional conductors, A A' A$^2$ and B B' B$^2$, the two opposite conductors of succeeding sections being connected together, as A and B', A' and B$^2$, &c. The end sections are connected, respectively, with the return-conductor and the generator G. A normal number of electric locomotives, C, are adapted to be included in circuit between the opposite conductors of each section. In the drawings this normal number is shown as three, and the generator will in that case be of sufficient capacity to furnish current for three locomotives, and electro-motive force adapted to the number of succeeding sections. The circuit will be seen to be from ground to generator G, to conductor A, through three locomotives in multiple arc, to conductor B, to conductor A, through three more locomotives in multiple arc, and so on. The advantage of this arrangement is that a means of automatic regulation is provided, while the large conductors necessary to a multiple-arc system are dispensed with. When any one of the three locomotives in multiple arc becomes overloaded from any cause, the rapidity of the revolution of the armature of the propelling-motor is reduced, and the counter electro-motive force consequently reduced correspondingly. Therefore a greater proportion of the current is absorbed by that motor, and its power increased in correspondence with the increased load. The arrangement of Fig. 1 would be sufficient for all practical purposes if the same number of locomotives could be maintained on each section, there being always at least one locomotive on each section; but as the length of the section is fixed and the locomotive adapted to move independently, it is difficult to maintain the normal number on each section. I therefore provide for each section a compensating device, which consists, in general, of a relay-magnet, which is in multiple arc with the locomotives, and consequently affected by any variation in the number of locomotives on a section or by any variation in their resistance. This relay-magnet is adapted to close a circuit in one direction or the other through an electric motor, which, when in action, cuts in or out more or less of a series of secondary batteries, which are also in multiple arc with the locomotives. The magnet and motor will be of comparatively high resistance.

In the drawings, M is the relay-magnet for section A' B', and is connected with the two main conductors, respectively, by the lines *a b*.

M' is an axial magnet having on the lower end of its core a block of insulating material, to which are attached independently two contact-strips, F and K, which are connected, respectively, to the two terminals of the motor D.

In the path of upward movement of the strips F and K are the two points *d* and *c*, connected, respectively, to the two main conductors, while in the path of their downward movement are the two points *e* and *f*, also connected to the two main conductors, but oppositely—that is, points *d* and *f* are connected to A through *a*, and *c* and *e* to B through *b*. The axis of the armature of motor D terminates in a beveled pinion, which meshes with a larger gear-wheel, N, from which extends radially a contact-arm, L, which moves over a circular series of contacts, which are connected to successive points in the series of secondary batteries E. One end of the series of batteries is connected to conductor B by line *g*, while the arm L, forming the other terminal, is connected to A through line *h*. Suppose, now, that four locomotives have accumulated on section A' B', leaving only two on section A$^2$ B$^2$, less current will therefore pass through M', and points F and K will fall on contacts *e* and *f*, sending the current through the motor in a manner to cause it to rotate arm L to cut in a longer series of batteries E. This will cause more current to pass through the four motors, and the batteries themselves will contribute a higher counter electro-motive force.

When the motor has cut in enough batteries to restore the normal equilibrium, M' will become energized again and draw up its core to its normal position with the two strips F and K between the points $d$ $c$ and the points $e$ $f$. On section $A^2$ $B^2$, when the number of locomotives is reduced to two, more current in consequence passes through M, and the reverse operation to that above described with regard to section A B takes place. When the normal number of locomotives per section is restored, the arm L resumes the position shown at section A B. This compensating device may be adjusted to not only respond to the removal of a locomotive from a section by breaking its circuit for stopping or by its moving onto an adjacent section, but to any changes in the resistance of the motors. Each motor will be provided with a circuit-breaker. The energy stored in the secondary batteries may be employed for lighting or power purposes along the line of the road in a manner which will be the subject of future applications for patents.

I do not herein make a broad claim to a system of electric railways in which groups of locomotives in multiple arc are placed in series with one another.

What I claim is—

1. The combination of sectional main conductors, one conductor in each section being connected to a conductor in the succeeding section, electric locomotives in circuit between said main conductors, the locomotives of each section being in multiple arc and those of succeeding sections in series, and secondary batteries in circuit with the locomotives of each section.

2. The combination of electric conductors extending along the line of an electric railway and divided into sections, a number of electric locomotives on said railway independently movable and divided into groups corresponding to the number of sections, the groups being in series and the locomotives of each group being in multiple arc, and means for compensating for any variation from the normal number of locomotives in any group.

3. The combination of sectional electric conductors extending along the line of an electric railway, a number of independently-movable electric locomotives on said railway divided into groups corresponding to the number of sections, the groups being in series and the locomotives of each group being in multiple arc, additional translating devices, and a regulator controlling their connection with the main circuit, whereby compensation is made for any variation from the normal number of locomotives on a section.

4. The combination of a generator giving a normal current, a number of main translating devices in multiple arc from said generator, a regulating-magnet in multiple arc with said devices, and additional compensating translating devices controlled by said magnet and adapted to be connected with the main line, so as to offer greater or less resistance according as more or less of the main translating devices are in circuit.

5. The combination of a number of groups of electric locomotives in multiple arc, the groups being in series with one another, and secondary batteries in multiple arc with the locomotives of each group, with a regulator for varying the resistance of the batteries in correspondence with the number of locomotives in circuit.

6. The combination of two sectional conductors extending along the line of an electric railway, one or more electric locomotives on each section having its two terminals connected constantly with the two opposite conductors of the section, respectively, a high-resistance magnet in multiple arc with the locomotives on each section, and a circuit between the two conductors of each section controlled by the said magnet.

EDWARD M. BENTLEY.

Witnesses:
GEO. L. WHEELOCK,
VICTOR A. LEWIS.